(12) United States Patent
Niittykoski et al.

(10) Patent No.: US 9,287,555 B2
(45) Date of Patent: Mar. 15, 2016

(54) MIXED METAL OXIDIZED HYDROXIDE AND METHOD FOR PRODUCTION

(75) Inventors: Janne Niittykoski, Pietarsaari (FI); Marten Eriksson, Pannainen (FI)

(73) Assignee: OMG Kokkola Chemical Oy, Kokkola (FI)

( * ) Notice: Subject to any disclaimer, the term of this patent is extended or adjusted under 35 U.S.C. 154(b) by 81 days.

(21) Appl. No.: 13/820,902

(22) PCT Filed: Sep. 22, 2010

(86) PCT No.: PCT/EP2010/063998
§ 371 (c)(1),
(2), (4) Date: Mar. 5, 2013

(87) PCT Pub. No.: WO2012/037975
PCT Pub. Date: Mar. 29, 2012

(65) Prior Publication Data
US 2013/0168600 A1    Jul. 4, 2013

(51) Int. Cl.
*H01M 4/131* (2010.01)
*C01G 53/00* (2006.01)
*H01M 4/505* (2010.01)
*H01M 4/525* (2010.01)

(52) U.S. Cl.
CPC ............ *H01M 4/131* (2013.01); *C01G 53/50* (2013.01); *H01M 4/505* (2013.01); *H01M 4/525* (2013.01); *C01P 2002/72* (2013.01); *C01P 2002/85* (2013.01); *C01P 2004/03* (2013.01); *C01P 2004/32* (2013.01); *C01P 2004/61* (2013.01); *C01P 2004/62* (2013.01); *C01P 2006/11* (2013.01); *C01P 2006/12* (2013.01); *C01P 2006/40* (2013.01); *C01P 2006/80* (2013.01); *Y02E 60/122* (2013.01)

(58) Field of Classification Search
CPC ...... H01M 4/131; H01M 4/505; H01M 4/525
See application file for complete search history.

(56) References Cited

U.S. PATENT DOCUMENTS

| | | | |
|---|---|---|---|
| 2003/0022063 A1 | 1/2003 | Paulsen et al. | |
| 2008/0160410 A1 | 7/2008 | Sun et al. | |
| 2009/0302267 A1* | 12/2009 | Albrecht et al. | ........... 252/182.1 |

FOREIGN PATENT DOCUMENTS

| | | |
|---|---|---|
| CA | 2694915 | 2/2009 |
| CN | 101262057 | 9/2008 |
| DE | 102007039471 | 2/2009 |
| JP | 2004227915 | 8/2004 |
| JP | 2006503789 | 2/2006 |

(Continued)

OTHER PUBLICATIONS

International Search Report for PCT/EP2010/063998 dated Jun. 9, 2011.

(Continued)

*Primary Examiner* — Necholus Ogden, Jr.
(74) *Attorney, Agent, or Firm* — Andrus Intellectual Property Law, LLP

(57) ABSTRACT

Disclosed are mixed metal oxidized hydroxide precursors that can be used for the preparation of lithium mixed metal oxide cathode materials for secondary lithium ion batteries and methods of making such mixed metal precursors. The precursors typically are particles of nickel, cobalt, and manganese mixed metal oxidized hydroxides with varying metal molar ratios prepared in co-precipitation reactions in two sequential reactors.

11 Claims, 6 Drawing Sheets

(56) References Cited

FOREIGN PATENT DOCUMENTS

| | | |
|---|---|---|
| JP | 2006302542 | 11/2006 |
| JP | 2007070205 | 3/2007 |
| JP | 2009515799 | 4/2009 |
| JP | 2010015959 | 1/2010 |
| JP | 2010536697 | 12/2010 |
| JP | 2011116580 | 6/2011 |
| WO | 2004092073 | 10/2004 |
| WO | 2007019986 | 2/2007 |

OTHER PUBLICATIONS

Written Opinion for PCT/EP2010/063998 dated Jun. 9, 2011.
Demand for International Preliminary Examination of PCT/EP2010/063998 filed Jun. 20, 2012.
International Preliminary Report on Patentability for PCT/EP2010/063998 dated Aug. 20, 2012.
English translation of Office Action issued on Nov. 25, 2014, for JP2013-529552.
English translation of Office Action issued on Jul. 2, 2014, for CN201080069068.5.

* cited by examiner

MIXED METAL OXIDIZED HYDROXIDE AND METHOD FOR PRODUCTION

CROSS REFERENCE TO RELATED APPLICATION

The present application is the U.S. national stage application of International Application PCT/EP2010/063998, filed Sep. 22, 2010, which international application was published on Mar. 29, 2012, as International Publication WO2012037975, the contents of which are incorporated herein by reference in their entireties.

The invention relates to mixed metal oxidized hydroxides and methods for production. More particularly, the invention relates to particles of mixed metal oxidized hydroxides containing multivalent metals with varying metal molar ratios. Even more particularly, the invention relates to particles of nickel, cobalt, and manganese mixed metal oxidized hydroxides with varying metal molar ratios prepared in a co-precipitation reaction in two sequential reactors.

BACKGROUND OF THE INVENTION

Lithium mixed metal oxides, $LiNi_{1-x-y}Co_xMn_yO_2$, (LNCMO) are recognized as a suitable replacement for lithium cobalt oxide, $LiCoO_2$, (LCO) as a cathode material in the secondary lithium ion batteries. Some of the reasons for the utilization of LNCMO include a lower price of the metals, increased availability of the metal raw materials, and tailorability of the electrochemical properties of LNCMO as compared to LCO. The preparation of LNCMO is, however, more challenging than that of LCO due to a higher probability of forming electrochemically inactive phases. The quality and uniformity of the cathode material is extremely important since it directly impacts battery performance. It has been observed that LNCMO properties and battery performance are more dependent on the properties of the mixed metal (NCM) precursor than in the case of the precursor for LCO. For example, metal composition, physical properties (e.g. particle size distribution, tap density) and morphology of the LNCMO particles are strongly derived from the manufactured precursor particles. Therefore, the preparation of the NCM precursor is a crucial step in preparing high quality LNCMO. Currently, NCM hydroxides ($Ni_{1-x-y}Co_xMn_y(OH)_2$) are used as precursors for LNCMO. The key challenge in preparing mixed metal hydroxides for use as precursors for LNCMO is to obtain particles of high density. Typically, NCM hydroxides are prepared by precipitating the hydroxides from an aqueous metal containing solution with the alkaline hydroxide and ammonia. Alkaline hydroxide is used to control pH and the particle size. Ammonia is typically used as a complexing agent to inhibit the growth rate of the particles and to increase final the density of the particles. Further improvements in producing high density particles have been achieved using reducing agents which prevent the oxidation of the metals during precipitation.

It is also known that NCM oxyhydroxides ($Ni_{1-x-y}Co_xMn_yOOH$) have been used as precursors for the preparation of LNCMO. In this approach, the precipitated precursor is subjected to a separate step which oxidizes the metals to the oxyhydroxide state prior to lithiation. This separate oxidation step can be done either chemically, through the addition of an oxidation agent, or thermally, with post heat treatment. The direct precipitation of oxyhydroxides is typically not preferred since the amount of impurities, for example sodium, increase due to possible lattice expansion and double salt precipitates. Therefore, the preferred approach is an additional oxidation step after the hydroxide precipitation to obtain an optimal precursor for cathode materials. Partly oxidized NCM hydroxides have also been proposed as precursors.

When considering the preparation of the NCM hydroxides and oxyhydroxides from an economical point of view, neither the addition of the reducing agent in the precipitation step nor the additional oxidation step is preferred.

Not withstanding the state of the art described herein, there is a need for further improvements in a mixed metal oxidized hydroxide precursor material and the production of such materials resulting in dense particles with high purity without the use of additional reducing agents or an oxidation step.

SUMMARY OF THE INVENTION

In general, in one embodiment of the invention a mixed metal oxidized hydroxide precursor material is provided. The mixed metal oxidized hydroxide precursor material is represented by the chemical formula:

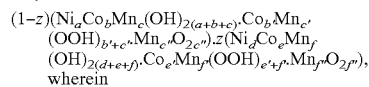

$$(1-z)(Ni_aCo_bMn_c(OH)_{2(a+b+c)}\cdot Co_{b'}Mn_{c'}(OOH)_{b'+c'}\cdot Mn_{c''}O_{2c''})\cdot z(Ni_dCo_eMn_f(OH)_{2(d+e+f)}\cdot Co_eMn_{f'}(OOH)_{e'+f'}\cdot Mn_{f''}O_{2f''}),$$

wherein $0<z<0.1$;
$A=a$, $B=b+b'$, $C=c+c'+c''$, $A+B+C=1$ and $0<A<1$, $0<B<1$, $0<C<1$;
$D=d$, $E=e+e'$, $F=f+f'+f''$ $D+E+F=1$ and $0<D<1$, $0<E<1$, $0<F<1$; and
$A<D$, $B>E$, $C>F$.

In yet another embodiment of the invention, a method of preparing a mixed metal oxidized hydroxide precursor material is provided. The method includes the steps of co-precipitating a solution comprising a plurality of metal salts, wherein the metals of the metal salts is selected from the group consisting of nickel, cobalt, manganese, and combinations thereof, with an alkaline hydroxide solution and ammonia to form a precipitate, filtering the precipitate, washing the precipitate, and drying the precipitate to form the mixed metal oxidized hydroxide precursor material, wherein the precursor material is represented by a chemical formula of:

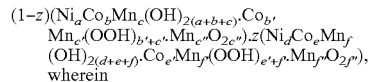

$$(1-z)(Ni_aCo_bMn_c(OH)_{2(a+b+c)}\cdot Co_{b'}Mn_{c'}(OOH)_{b'+c'}\cdot Mn_{c''}O_{2c''})\cdot z(Ni_dCo_eMn_f(OH)_{2(d+e+f)}\cdot Co_eMn_{f'}(OOH)_{e'+f'}\cdot Mn_{f''}O_{2f''}),$$

wherein $0<z<0.1$;
$A=a$, $B=b+b'$, $C=c+c'+c''$, $A+B+C=1$ and $0<A<1$, $0<B<1$, $0<C<1$;
$D=d$, $E=e+e'$, $F=f+f'+f''$ $D+E+F=1$ and $0<D<1$, $0<E<1$, $0<F<1$; and
$A<D$, $B>E$, $C>F$.

The mixed metal oxidized hydroxide particles formed by the method have a gradient structure wherein the molar ratio of nickel, in comparison to cobalt and manganese, is in the majority at the surface; and a composition with a metal molar ratio that varies from the surface towards the interior of the particles with an average particle size of 3-30 μm, surface are of 2-20 m²/g, and tap density of 0.8-2.8 g/cm³. The particle morphology of mixed metal oxidized hydroxide is composed of spherical particles containing non-spherical particles.

These and other advantages and novel features of the present invention, as well as details of an illustrated embodiment thereof, will be more fully understood from the following description.

DETAILED DESCRIPTION OF THE INVENTION

Figure 1:
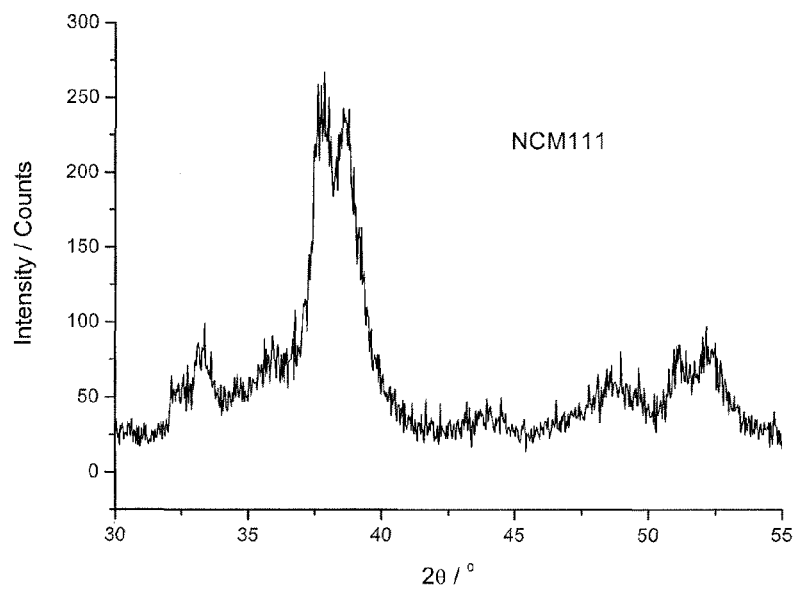
FIG. 1. is an XRD pattern of a NCM 111 precursor according to an embodiment of the invention.

In one embodiment, the invention is related to mixed metal oxidized hydroxide precursors that can be used for the preparation of lithium mixed metal oxide cathode materials for the secondary lithium ion batteries and the method of making such mixed metal precursors.

For the preparation of the mixed metal oxidized hydroxide precursors, in a first reactor, a brine, including either a sulfate or chloride, containing nickel (Ni), cobalt (Co), and manganese (Mn) having a total metal concentration in the range of 1-2 mol/l is reacted simultaneously with an ammonia containing chemical, for example aqueous ammonia, and an alkaline hydroxide solution, for example sodium hydroxide, to precipitate >90%, but less than 100% of the available metals in solution, into a mixed metal oxidized hydroxide reaction suspension. All of the solutions are fed separately into the first reactor. The reaction suspension is mixed vigorously during the first precipitation reaction. The precipitate formed in this step has the general chemical formula of:

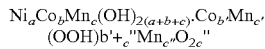
$Ni_aCo_bMn_c(OH)_{2(a+b+c)} \cdot Co_{b'}Mn_{c'}(OOH)_{b'+c''}Mn_{c''}O_{2c''}$ The reacted solution containing this precipitate is transferred sequentially to a second reactor where an additional amount of an alkaline hydroxide solution, for example sodium hydroxide, is added to precipitate out the remaining metals from the solution. The precipitate formed in the second reactor has the general chemical formula of:

$Ni_dCo_eMn_f(OH)_{2(d+e+f)} \cdot Co_{e'}Mn_{f'}(OOH)_{e'+f'} \cdot Mn_{f''}O_{2f''}$.

Depending upon the method conditions, the second precipitate may deposit onto the surface of the first precipitate.

In one embodiment of the precipitation method, the pH may be controlled within the range of 10-14. In yet another embodiment, the pH may be controlled within the range of 11.5-12.5 with the accuracy of 0.05. In one embodiment of the precipitation method the ammonia:metal molar ratio is in the range of 0.10:3.00. In yet another embodiment, the ammonia:metal molar ratio is in the range of 0.50:1.50 with an accuracy of 0.05. In one embodiment, the precipitation method may be conducted within a temperature range of 30-90° C. In yet another embodiment, the precipitation method may be conducted within a temperature range of 50-70° C. with an accuracy of 0.1° C. In one embodiment, the dwell time of the precipitation method is in the range from 1-25 hours. In yet another embodiment, the dwell time of the precipitation method is in the range from 5-15 hours.

The design of the reactors and the mixer is optimized to allow high mixing power. This method step determines a majority of the physical properties of the mixed metal oxidized hydroxide. Potentially one or several doping elements selected from the group of magnesium, aluminum, zirconium, and titanium may be added as brine and co-precipitated with the other metals in the first and/or second reactor. One or more metals selected from Ni, Co and Mn may also be added as brine in the second reactor to modify the composition.

The final precipitate from the second precipitation reaction is filtered from the solution, washed by warm water and dried.

The oxidation of the mixed metal hydroxide may occur during the first and/or second precipitation method from the presence of residual air inside each of the sequential reactors. No additional steps including the addition of reducing agents or oxidants are used to control the oxidation state of the mixed metal hydroxide during the precipitation methods. However, further oxidation of the mixed metal hydroxide may occur during drying.

The mixed metal oxidized hydroxide formed by the precipitation method described herein is a composite of oxidized hydroxide alloyed phases where Ni has an oxidation state of 2+, Co has oxidation states of 2+, 3+ and Mn has oxidation states of 2+, 3+, 4+. The general formula describing the composite is shown below in equation 1:

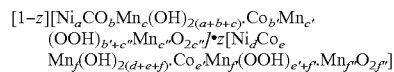
$[1-z][Ni_aCo_bMn_c(OH)_{2(a+b+c)} \cdot Co_{b'}Mn_{c'}(OOH)_{b'+c''} \cdot Mn_{c''}O_{2c''}] \cdot z[Ni_dCo_eMn_f(OH)_{2(d+e+f)} \cdot Co_{e'}Mn_{f'}(OOH)_{e'+f'} \cdot Mn_{f''}O_{2f''}]$ Where:
$0<z<0.1$
$0<A<1, 0<B<1, 0<C<1$ and $A+B+C=1$
$A=a, B=b+b', C=c+c'+c''$
$0<D<1, 0<E<1, 0<F<1$ and $D+E+F=1$
$D=d, E=e+e', F=f+f'+f''$
In general, $A<D, B>E, C>F$ which means the final precipitate will have a molar ratio of Ni, in comparison to Co and Mn, that is in the majority at the surface.

The chemical structure and composition is determined with the aid of X-ray powder diffraction (XRD), X-ray fluorescence (XRF), X-ray photoemission spectroscopy (XPS) and by an iodine/thiosulfate titration method as described in Anal. Chim. Acta 28 (1963) 282. Usually, XRD shows the mixture of hydroxide (space group #164) and oxyhydroxide (space group #166) as well as amorphous material. XRF has been used to analyze the bulk composition of the metals. XPS has been used to analyze the oxidation state and the environment of the metals more deeply. Generally, $Ni^{2+}$, $Co^{2+}$, $Co^{3+}$, $Mn^{2+}$, $Mn^{3+}$, $Mn^{4+}$ ions as well as small amount (<10%) of oxides, in addition to hydroxides, are observed by XPS. The oxide phase is $MnO_2$. The average oxidation state (AZ) of the metals is determined by the titration method. The average oxidation state of the metals depend strongly on the chemical composition, but Ni rich compositions have lower average oxidation state than those of Mn rich compositions, in general. The average oxidation state depends also on the method steps, wherein AZ is usually 2.0-2.2 after the precipitation, but typically 2.1-2.9 after the drying depending on the chemical composition.

Particles formed by the precipitation method described herein have been determined to have a gradient structure wherein the molar ratio of Ni, in comparison to Co and Mn, is in the majority at the surface, and a composition with a metal molar ratio which varies from the surface towards the interior of the particles. In equation 1, z represents the outer layer precipitated in the second reactor. At typical precipitation conditions, z is 0.02-0.03 which translates to the layer precipitated in the second reactor is usually 70-100 nm deep. The surface composition is due to the slower precipitation rate of Ni compared to those of Co and Mn in the second precipitation reaction. In an embodiment of the invention, the method is optimized for the precipitation of dense, pure mixed metal oxidized hydroxide particles. Since this method does not utilize an additional reducing agent or oxidation step, it offers an economical way to produce high density and pure mixed metal precursor particles for the LNCMO cathode materials.

The detailed composition of the mixed metal oxidized hydroxide precursors can be determined with the aid of XRD, XRF, XPS and the titration. For example, it was observed in a precursor with an overall bulk composition having a Ni:Co:Mn ratio of 1:1:1, with z=0.02 had a surface composition where the Ni:Co:Mn ratio was 8:1:1 and the ratio of $Co^{2+}$:$Co^{3+}$ and $Mn^{2+}$:$Mn^{3+}$:$Mn^{4+}$ of 2:3 and 7:6:6, respectively. If these oxidation states are assumed throughout the particles, the precursor could be described by the following formula:

$$0.98[Ni_{0.32}Cu_{0.11}Mn_{0.12}(OH)_{1.1}.Co_{0.23}Mn_{0.12} (OOH)_{0.35}.Mn_{0.1}O_{0.2}] \cdot 0.02[Ni_{0.8}Cu_{0.03}Mn_{0.04} (OH)_{1.74}Cu_{0.07}Mn_{0.03}(OOH)_{0.1}. Mn_{0.03}O_{0.06}]$$

The mixed metal oxidized hydroxide particles produced by the method described above were analyzed for various physical characteristics including the average particle size (D50), the tapping density, the surface area, the sodium and the sulfate level, and the overall particle morphology. In one embodiment, the average particle size (D50), as measured by laser diffraction, was determined to be controllable in the range of 3-30 microns. In yet another embodiment, the average particle size (D50), as measured by laser diffraction, was determined to be controllable in the range of 7-13 microns. In another embodiment, the tapping density was controllable in the range of 0.8-2.8 g/cm$^3$. In still yet another embodiment, the tapping density was controllable in the range of 1.8-2.3 g/cm$^3$. In one embodiment, the surface area, which may be varied, was determined to be in the range of 2-20 m$^2$/g. In yet another embodiment, the surface area, which may be varied, was determined to be in the range of 2-8 m$^2$/g. In another embodiment, the sodium level is controllable less 500 ppm and the sulfate level is less than 0.8%. In still yet another embodiment, the sodium level is controllable less 300 ppm and the sulfate level is less than 0.6%. Other impurities may be controlled based on the feed solutions used during the precipitation method. The particle morphology of the mixed metal oxidized hydroxide was determined to be composed of spherical particles and a small amount of non-spherical particles with a shape factor <0.7 determined from the cross section SEM photographs by measuring particles diameters for two perpendicular directions.

The following Examples illustrate the preparation of the mixed metal oxidized hydroxides in accordance with the method of the invention, but these examples are not considered to be limiting the scope of this invention. Unless otherwise indicated in the following examples and elsewhere in the specification and claims, all parts and percentages are by weight, and all temperatures are in degrees Celsius.

EXAMPLES

Formation of NCM 111 Mixed Metal Oxidized Precursor

Example 1

Ni:Co:Mn sulfate solution with the total metal concentration of 2 mol/L and with a Ni:Co:Mn molar ratio of 1:1:1 was fed into the first precipitation reactor. Simultaneously, NH$_3$ solution with a concentration of 12 mol/L and an ammonia:metal ratio of 1:1, as well as NaOH solution with the concentration of 5 mol/L, was fed in the reactor. The pH was kept at 11.6 in the reactor by adjusting the NaOH feeding rate. The feeding rates of all of the solutions were controlled in order to maintain the ideal conditions in the reactor. The temperature was kept constant at 70° C. Vigorous mixing was introduced into the reactor. The average dwell time of the precipitate in the reactor was 20 hours.

The formed suspension was transferred sequentially to a second reactor where additional NaOH was added to precipitate out the remaining metals from solution and to wash out SO$_4$ impurities. About 2% of metals were precipitated in this second reactor. The temperature was kept constant at 70° C. The vigorous mixing was introduced in to the reactor. The final precipitate was filtered from the solution, washed by warm water and dried at 105° C.

The as formed mixed metal precursor (NCM111) had a bulk metal molar ratio of Ni:Co:Mn of 1:1:1 as analyzed by X-ray fluorescence (XRF). Both the hydroxide and oxyhydroxide phases were observed by XRD from the as formed mixed metal precursor as seen in FIG. 1. The oxyhydroxide was the main phase. X-ray photoemission spectroscopy (XPS) showed the metal composition on the surface to be high in nickel with a Ni:Co:Mn ratio of 8:1:1 containing oxidation states of Ni$^{2+}$, Co$^{2+}$, Co$^{3+}$, Mn$^{2+}$, Mn$^{3+}$ and Mn$^{4+}$. The ratio of Co$^{2+}$:Co$^{3+}$ and Mn$^{2+}$:Mn$^{3+}$:Mn$^{4+}$ oxidation states was determined to be 2:3 and 7:6:6, respectively. With z=0.02 and assuming the same oxidation states throughout the particles, the formula for this composition can be described as:

$$0.98[Ni_{0.32}Cu_{0.11}Mn_{0.12}(OH)_{1.1}Co_{0.23}Mn_{0.12} (OOH)_{0.35}Mn_{0.1}O_{0.2}] \cdot 0.02[Ni_{0.8}Cu_{0.03}Mn_{0.04} (OH)_{1.74}Cu_{0.07}Mn_{0.03}(OOH)_{0.1}.Mn_{0.03}O_{0.06}]$$

Figure 2:
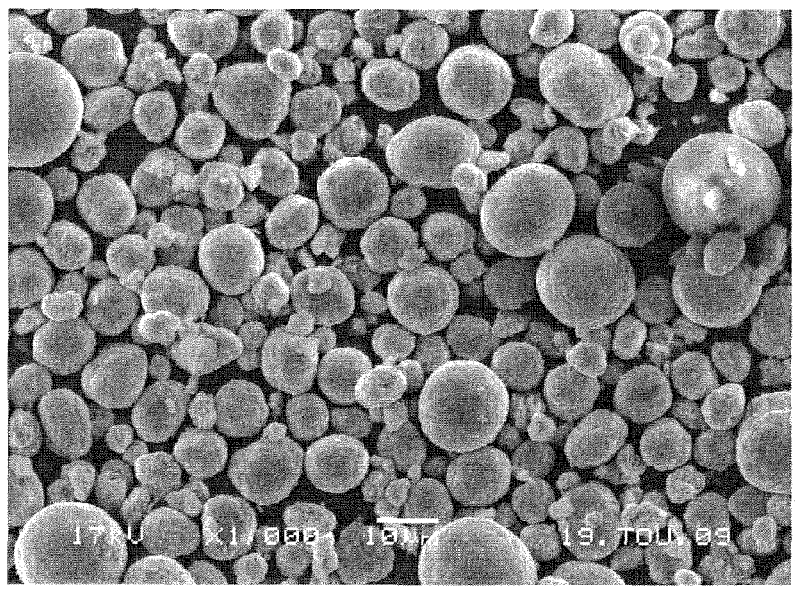
FIG. 2. is a SEM photograph of NCM 111 precursor according to an embodiment of the invention.

The mean particle size (D50) of the as formed mixed metal precursor was 11.0 μm and the tap density (TD) was measured to be 2.2 g/cm$^3$. The sodium and sulfate impurities analyzed by ICP spectrometer were 250 ppm and 0.5%, respectively. SEM photographs showed that as formed mixed metal precursor particles were dense and composed of mainly of spherical particles with a small fraction of non-spherical particles having a shape factor <0.7 as seen in FIG. 2.

The as formed mixed metal oxidized hydroxide precursor can be further used in the preparation of the lithium mixed metal oxide cathode material. In the lithiation step, NCM111 precursor was intimately mixed with Li$_2$CO$_3$ at a controlled Li/Me ratio where Me=Ni+Co+Mn. After mixing the material was calcinated at 1000° C. for 8 h in air. D50 and TD of the as formed LiNi$_{1/3}$Co$_{1/3}$Mn$_{1/3}$O$_2$(LNCM111) were 11.0 um and 3.0 g/cm$^3$, respectively.

Figure 3:
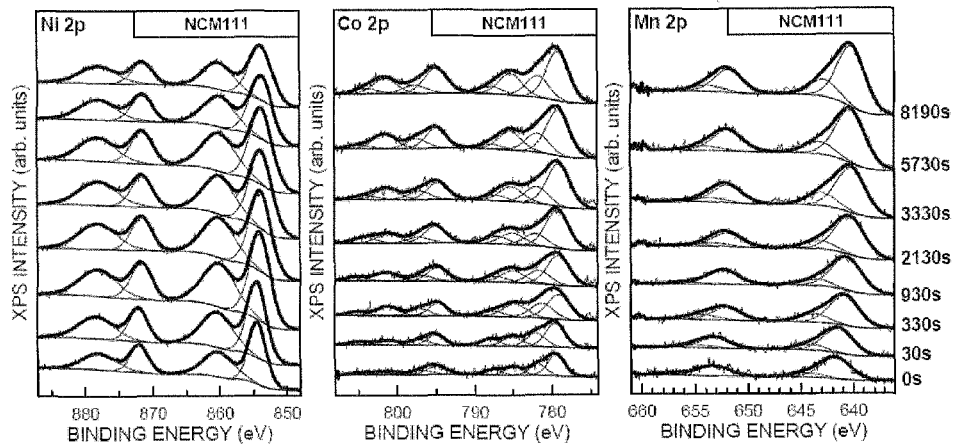
FIG. 3. is an XPS spectra of NCM 111 precursor according to an embodiment of the invention.

The mixed metal oxidized hydroxide precursor made according to Example 1 was analyzed with XPS having sputtering capabilities for depth profiling. As seen in FIG. 3, the results of the XPS analysis showed the mixed metal precursor had a metal composition that gradually changed from the surface towards the interior of the particle with a presence of $Ni^{2+}$, $Co^{2+}$, $Co^{3+}$, $Mn^{2+}$, $Mn^{3+}$ and $Mn^{4+}$. The metal ratio of Ni:Co:Mn was about 8:1:1 at the surface of the particles, but about 5:2:2 at a depth of about 80 nm below the surface as seen in Table 1 below.

TABLE 1

| Sputtering time (sec) | Estimated depth (nm) | Ni:Co:Mn Ratio |
|---|---|---|
| 0 | 0 | 75:13:12 |
| 30 | 0.3 | 77:13:10 |
| 330 | 3.3 | 77:13:10 |
| 930 | 9.3 | 75:14:11 |
| 2130 | 21.3 | 71:16:13 |
| 3330 | 33.3 | 68:17:15 |
| 5730 | 57.3 | 60:21:19 |
| 8130 | 81.3 | 54:24:22 |

The above results indicate that the as formed mixed metal oxidized hydroxide precursor particles have a complex composition of mixed phases and metal oxidation states with a gradient structure wherein the molar ratio of Ni, in comparison to Co and Mn, is in the majority at the surface, and a composition with a metal molar ratio that varies from the surface towards the interior of the particles.

Formation of NCM 523 Mixed Metal Oxidized Precursor

Example 2

Ni:Co:Mn sulfate solution with the total metal concentration of 2 mol/L and with the Ni:Co:Mn molar ratio of 5:2:3 was fed in the first precipitation reactor. Simultaneously, $NH_3$ solution with a concentration of 12 mol/L and an ammonia:metal ratio of 1:1, as well as NaOH solution with the concentration of 5 mol/L, was fed in the reactor. The pH was kept at 11.7 in the reactor by adjusting the NaOH feeding rate. The feeding rates of all the solutions were controlled in order to maintain the ideal conditions in the reactor. The temperature was kept constant at 70° C. Vigorous mixing was introduced into the reactor. The average dwell time of the precipitate in the reactor was 5 hours.

The formed suspension was transferred sequentially to a second reactor where additional NaOH was added to precipitate out the remaining metal from solution and to wash out the $SO_4$ impurities. About 3% of metals were precipitated in this second reactor. The temperature was kept constant at 70° C. Vigorous mixing was introduced in to the reactor. The final precipitate was filtered from the solution, washed by warm water and dried in air at 105° C.

Figure 4:
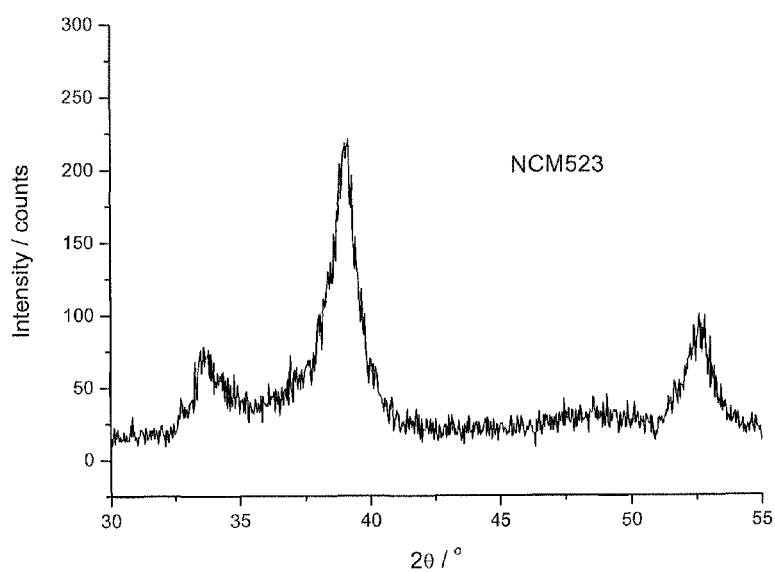
FIG. 4. is an XRD pattern of NCM 523 precursor according to an embodiment of the invention.

The as formed mixed metal oxidized hydroxide precursor (NCM523) had a bulk metal molar ratio of Ni:Co:Mn of 5:2:3 as analyzed by XRF. Both the hydroxide and oxyhydroxide phases were observed by the XRD from the as formed mixed metal precursor as seen in FIG. 4. The hydroxide was the main phase. XPS analysis showed the mixed metal precursor particles had a metal composition where the Ni:Co:Mn ratio was about 8:1:1 at the surface with a presence of $Ni^{2+}$, $Co^{2+}$, $Co^{3+}$, $Mn^{2+}$, $Mn^{3+}$ and $Mn^{4+}$.

Figure 5:
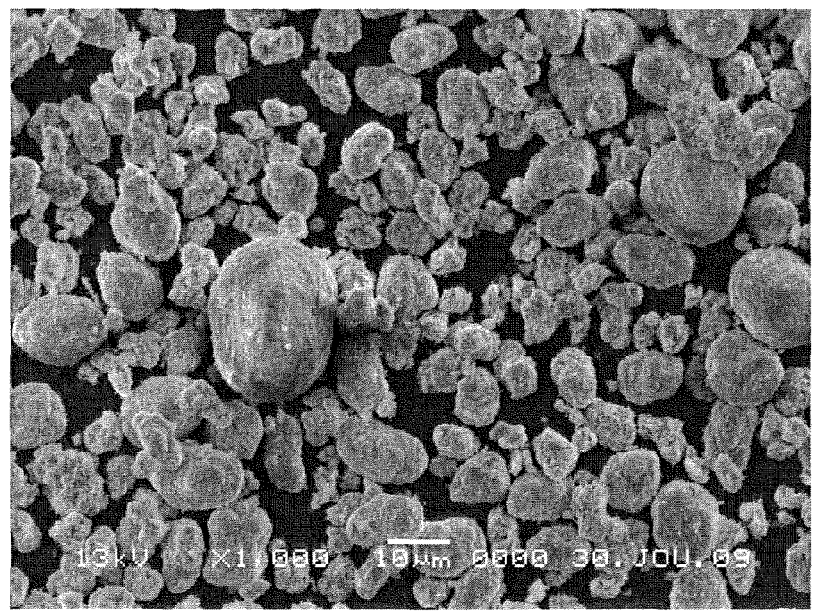
FIG. 5. is a SEM photograph of NCM 523 precursor according to an embodiment of the invention.

The mean particle size of the as formed mixed metal precursor (D50) was 10.0 μm and the tap density (TD) was measured to be 2.0 g/cm³. The sodium and sulfate impurities analyzed by ICP spectrometer were 150 ppm and 0.5%, respectively. As seen in FIG. 5, the SEM photographs showed that as formed mixed metal precursor particles were dense and composed of spherical particles with a non-spherical particles, as well.

The above results indicate that the as formed mixed metal oxidized hydroxide precursor particles have a complex composition of mixed phases and metal oxidation states wherein the molar ratio of Ni, in comparison to Co and Mn, is in the majority at the surface.

Formation of First Comparative NCM 111 Mixed Metal Oxidized Precursor

Example 3

Ni:Co:Mn sulfate solution with the total metal concentration of 2 mol/L and a Ni:Co:Mn molar ratio of 1:1:1 was fed into the first precipitation reactor. Simultaneously, $NH_3$ solution with a concentration of 12 mol/L and an ammonia:metal ratio of 1:1, as well as NaOH solution with the concentration of 5 mol/L, was fed in the reactor. The pH was kept at 13.2 in the reactor by adjusting the NaOH feeding rate. The elevated pH facilitated the precipitation of substantially all of the metals in the first reactor. The feeding rates of all the solutions were controlled in order to maintain the ideal conditions in the reactor. The temperature was kept constant at 70° C. The vigorous mixing was introduced into the reactor. The average dwell time of the precipitate in the reactor was 20 hours. The final precipitate was filtered from the solution, washed by warm water and dried at 105° C.

Figure 6:
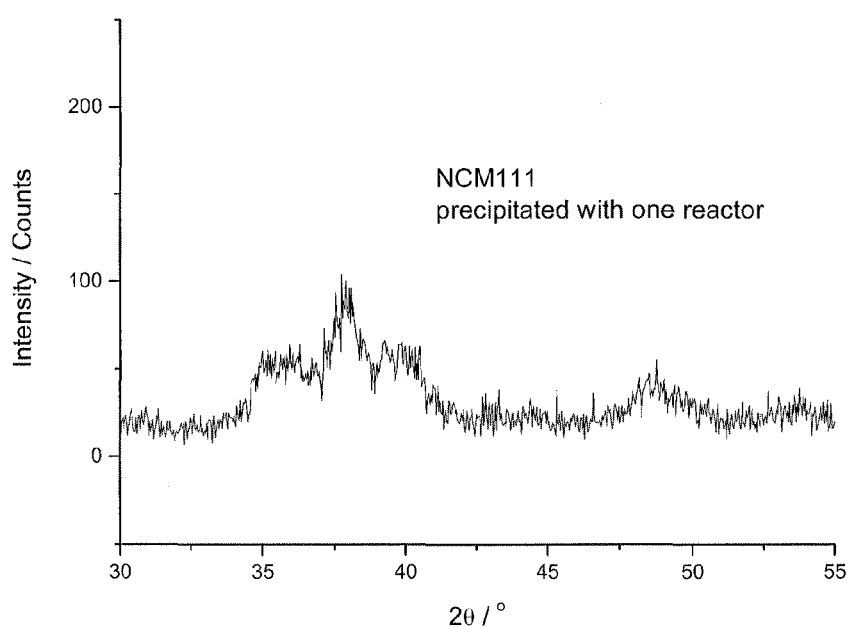
FIG. 6. is an XRD pattern of NCM 111 precursor precipitated in one reactor according to an embodiment of the invention.

The as formed mixed metal precursor (NCM111) had a bulk metal molar ratio of Ni:Co:Mn of 1:1:1 as analyzed by XRF. As seen in FIG. 6, both of the hydroxide and oxyhydroxide phases were observed by XRD from the as formed mixed metal precursor. Reflections of the XRD pattern were weak and broad indicating less crystalline material compared to Example 1.

Figure 7:
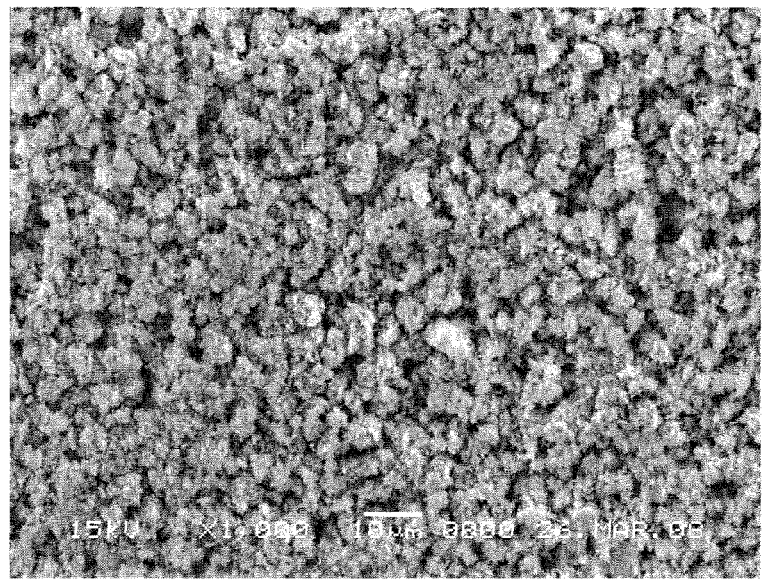
FIG. 7. is a SEM photograph of NCM 111 precursor precipitated in one reactor according to an embodiment of the invention.

D50 of the as formed mixed metal precursor was determined to be 4.0 μm and the tap density was measured to be 0.8 g/cm³. The sodium and sulfate impurities analyzed by ICP spectrometer were determined to be 300 ppm and 0.5%, respectively. SEM photographs, as seen in FIG. 7, showed that the as formed mixed metal precursor particles were not dense and were composed mainly of irregular non-spherical particles.

The material precipitated in one reactor has much lower density and smaller particle size than that of Example 1. Furthermore, the resultant particles are less spherical than those of the Example 1. This result indicates that the properties of the precursor benefit by using the two-step sequential precipitation process described in Example 1.

Formation of Second Comparative NCM 111 Mixed Metal Oxidized Precursor

Example 4

Ni:Co:Mn sulfate solution with the total metal concentration of 2 mol/L and with a Ni:Co:Mn molar ratio of 1:1:1 was fed in the first precipitation reactor. Simultaneously, $NH_3$ solution with a concentration of 12 mol/L and an ammonia:metal ratio of 1:1, as well as NaOH solution with the concentration of 5 mol/L, was fed in the reactor. The pH was kept at 11.6 in the reactor by adjusting the NaOH feeding rate. The feeding rates of all the solutions were controlled in order to maintain the ideal conditions in the reactor. The temperature was kept constant at 70° C. The vigorous mixing was introduced into the reactor. The average dwell time was 20 hours.

The formed suspension was transferred sequentially to a second reactor where additional NaOH was added to precipitate out the remaining metal from solution and to wash out $SO_4$ impurities. About 2% of the metals were precipitated in this second reactor. The temperature was kept constant at 70° C. The vigorous mixing was introduced in to the reactor. The final precipitate was filtered from the solution, washed by warm water and dried at 105° C. The dried precursor was then subjected to an additional oxidation step by heat treatment at 120° C. to form an oxyhydroxide precursor.

Figure 8:
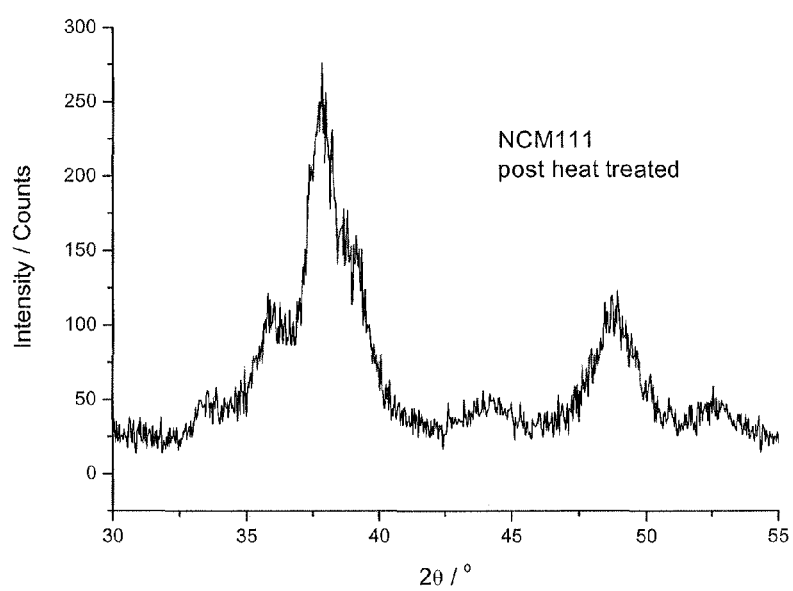
FIG. 8. is an XRD pattern of NCM 111 precursor with post heat treatment according to an embodiment of the invention.

The as formed mixed metal precursor (NCM111) had a bulk metal molar ratio of Ni:Co:Mn of 1:1:1 as analyzed by X-ray fluorescence (XRF). As seen in FIG. 8, primarily, the oxyhydroxide phase was observed by XRD from the as formed mixed metal precursor. When compared to the material prepared in Example 1, due to the heat treatment step, the reflections at ~33, ~39 and ~52° for this material were less intense and the reflection at ~48° more intense indicating the decreased amount of hydroxide and increased amount of the oxyhydroxide, respectively.

Figure 9:
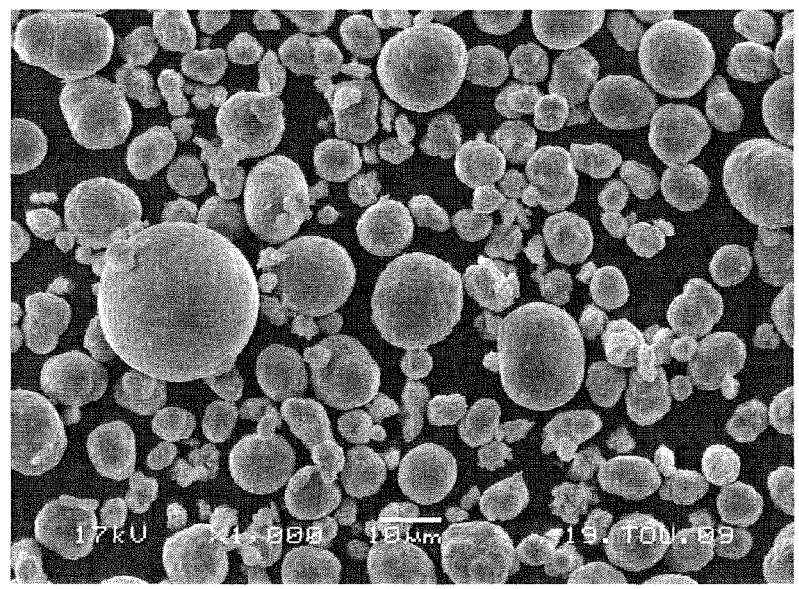
FIG. 9. is a SEM photograph of NCM 111 precursor with post heat treatment according to an embodiment of the invention.

The mean particle size of the as formed mixed metal oxyhydroxide precursor (D50) was 11.0 µm and the tap density was measured to be 2.4 g/cm³. The sodium and sulfate impurities analyzed by ICP spectrometer were 250 ppm and 0.5%, respectively. As seen in FIG. 9, the SEM photographs showed that as formed mixed metal oxyhydroxide precursor particles were dense and had mostly the spherical morphology.

The as formed mixed metal oxyhydroxide precursor was used in the preparation of a lithium mixed metal oxide cathode material. In the lithiation step, the NCM111 precursor was intimately mixed with $Li_2CO_3$ using the same Li/Me ratio as Example 1. After mixing, the mixed material was calcinated at 1000° C. for 8 hours in air. The mean particle size and tap density of the as formed $LiNi_{1/3}Co_{1/3}Mn_{1/3}O_2$ (LNCMO) were 11.0 um and 3.0 g/cm³, respectively. When compared to Example 1, the physical properties of LNCMO were the same even though the oxidation heat treatment increased the tap density of the NCM precursor by 0.2 g/cm³. This result indicates that an additional oxidation step prior lithiation does not provide a benefit to the LNCMO when using precursor made with the two sequential precipitation process as described in Example 1.

Formation of First Comparative NCM 523 Mixed Metal Oxidized Precursor

Example 5

Ni:Co:Mn sulfate solution with the total metal concentration of 2 mol/L and a Ni:Co:Mn molar ratio of 5:2:3 was fed in the first precipitation reactor. Simultaneously, $NH_3$ solution with a concentration of 12 mol/L and an ammonia:metal ratio of 1:1, as well as NaOH solution with the concentration of 5 mol/L, was fed in the reactor. The pH was kept at 11.7 in the reactor by adjusting the NaOH feeding rate. Hydrazine was added about 0.1 mol-% from metals as a reducing agent in the reactor. The feeding rates of all the solutions were controlled in order to maintain the ideal conditions in the reactor. Temperature was kept constant at 70° C. The vigorous mixing was introduced in to the reactor. The average dwell time of the precipitate in the reactor was 5 hours.

The formed suspension was transferred sequentially to a second reactor where additional NaOH was added to precipitate out the remaining metal from solution and to wash out $SO_4$ impurities. About 3% of metals were precipitated in this second reactor. The temperature was kept constant at 70° C. The vigorous mixing was introduced in to the reactor. The final precipitate was filtered from the solution, washed by warm water and dried at 105° C.

Figure 10:
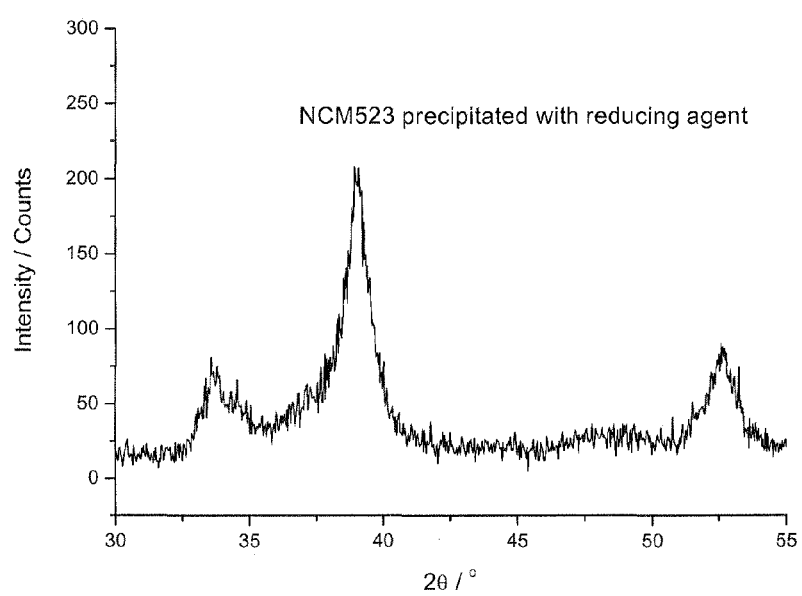
FIG. 10. is an XRD pattern of NCM 523 precursor precipitated with reducing agent according to an embodiment of the invention.

The as formed mixed metal precursor (NCM523) had a bulk metal molar ratio of Ni:Co:Mn of 5:2:3 as analyzed by XRF. As seen in FIG. 10, both of the hydroxide and oxyhydroxide phases were observed by the XRD from the as formed mixed metal precursor. The hydroxide was the main phase.

Figure 11:
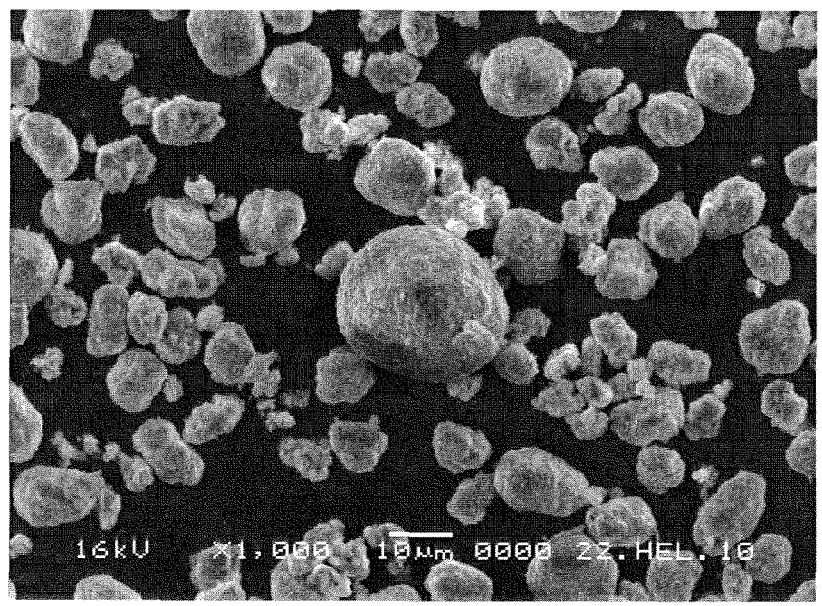
FIG. 11. is a SEM photograph of NCM 523 precursor precipitated with reducing agent according to an embodiment of the invention.

The mean particle size of the as formed mixed metal precursor was 10 µm and the tap density was measured to be 2.0 g/cm³. The sodium and sulfate impurities analyzed by ICP spectrometer were 150 ppm and 0.5%, respectively. As seen in FIG. 11, the SEM photographs showed that as formed mixed metal precursor particles were dense and were spherical but containing non-spherical particles.

The physical properties and impurities of NCM 523 precursor are the same as that in Example 2. This result indicates that addition of reducing agent is not necessary and does not benefit to the properties of the precursor when using the two sequential precipitation process described in Example 2.

Based upon the foregoing disclosure, it should now be apparent that the mixed metal oxidized hydroxide materials and the method of preparing such materials as described herein will carry out the embodiments set forth hereinabove. It is, therefore, to be understood that any variations evident fall within the scope of the claimed invention and thus, the selection of specific component elements can be determined without departing from the spirit of the invention herein disclosed and described.

The invention claimed is:

1. A mixed metal oxidized hydroxide precursor material represented by the chemical formula:

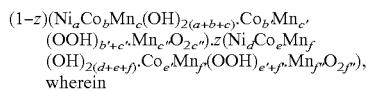

wherein $0<z<0.1$;

A=a, B=b+b', C=c+c'+c", A+B+C=1 and $0<A<1$, $0<B<1$, $0<C<1$;

D=d, E=e+e', F=f+f'+f" D+E+F=1 and $0<D<1$, $0<E<1$, $0<F<1$; and

A<D, B>E, C>F.

the precursor material comprises spherical and non-spherical particles having a surface and an interior, and the particles have a gradient structure wherein a molar ratio of Ni, in comparison to Co and Mn, is in the majority at the surface, and a composition with a metal molar ratio that varies from the surface towards the interior of the particles, and the surface of the particles has a Ni:Co:Mn ratio of about 8:1:1.

2. The precursor material of claim 1, wherein the particles are doped with at least one metal ion selected from the group consisting of Mg, Al, Zr, Ti, Ni, Co, and Mn.

3. The precursor material of claim 1, wherein the precursor material has an average particle size (D50) in the range from 3-30 microns.

4. The precursor material of claim 3, wherein the precursor material has an average particle size (D50) in the range from 7-13 microns.

5. The precursor material of claim 1, wherein the precursor material has a tap density in the range from 0.8-2.8 g/cm³.

6. The precursor material of claim 5, wherein the precursor material has a tap density in the range from 1.8-2.3 g/cm³.

7. The precursor material of claim 1, wherein the precursor material has a surface area in the range from 2-20 m²/g.

8. The precursor material of claim 7, wherein the precursor material has a surface area in the range from 2-8 m²/g.

9. The precursor material of claim 1, wherein a sodium level within the precursor material is less than 500 ppm.

10. The precursor material of claim 9, wherein a sodium level within the precursor material is less than 300 ppm.

11. A lithiated cathode active material for lithium ion batteries prepared with the precursor material of claim 1.

* * * * *